Jan. 28, 1947.  H. J. DE N. McCOLLUM  2,414,828
HEATING SYSTEM
Filed July 21, 1943  2 Sheets-Sheet 1

Patented Jan. 28, 1947

2,414,828

UNITED STATES PATENT OFFICE 2,414,828

HEATING SYSTEM

Henry J. DeN. McCollum, Chicago, Ill.; Thelma McCollum, executrix of said Henry J. DeN. McCollum, deceased, assignor to Stewart-Warner Corporation, Chicago, Ill., a corporation of Virginia Application July 21, 1943, Serial No. 495,585

3 Claims. (Cl. 126—110)

My invention relates to heating systems, and more particularly to a heating system of the internal combustion type.

An object of my invention is to provide a heating system which is more efficient than the heating systems of the prior art and which is independent of any outside source of energy.

Another object of my invention is to provide a heating system having a new and improved heat exchange means.

Another object of my invention is to provide a heating system having a new and improved combustion chamber.

Another object of my invention is to provide a self-contained and self-energized heating system having new and improved means for supplying air thereto.

Another object of my invention is to provide a heating system having new and improved means for preventing overheating of the prime mover for operating the heating system.

A further object of my invention is to provide a self-contained heating system which has improved means for controlling the heat output of the system.

Other objects and advantages will become apparent as the description proceeds.

The subject matter of this application is an improvement on that disclosed in my copending application Serial No. 496,813 filed July 30, 1943, and in my application Serial No. 494,943 filed July 16, 1943.

In the drawings:

Fig. 3 is a sectional view of a detail and is taken on the line 3—3 of Fig. 2.

Figure 1:
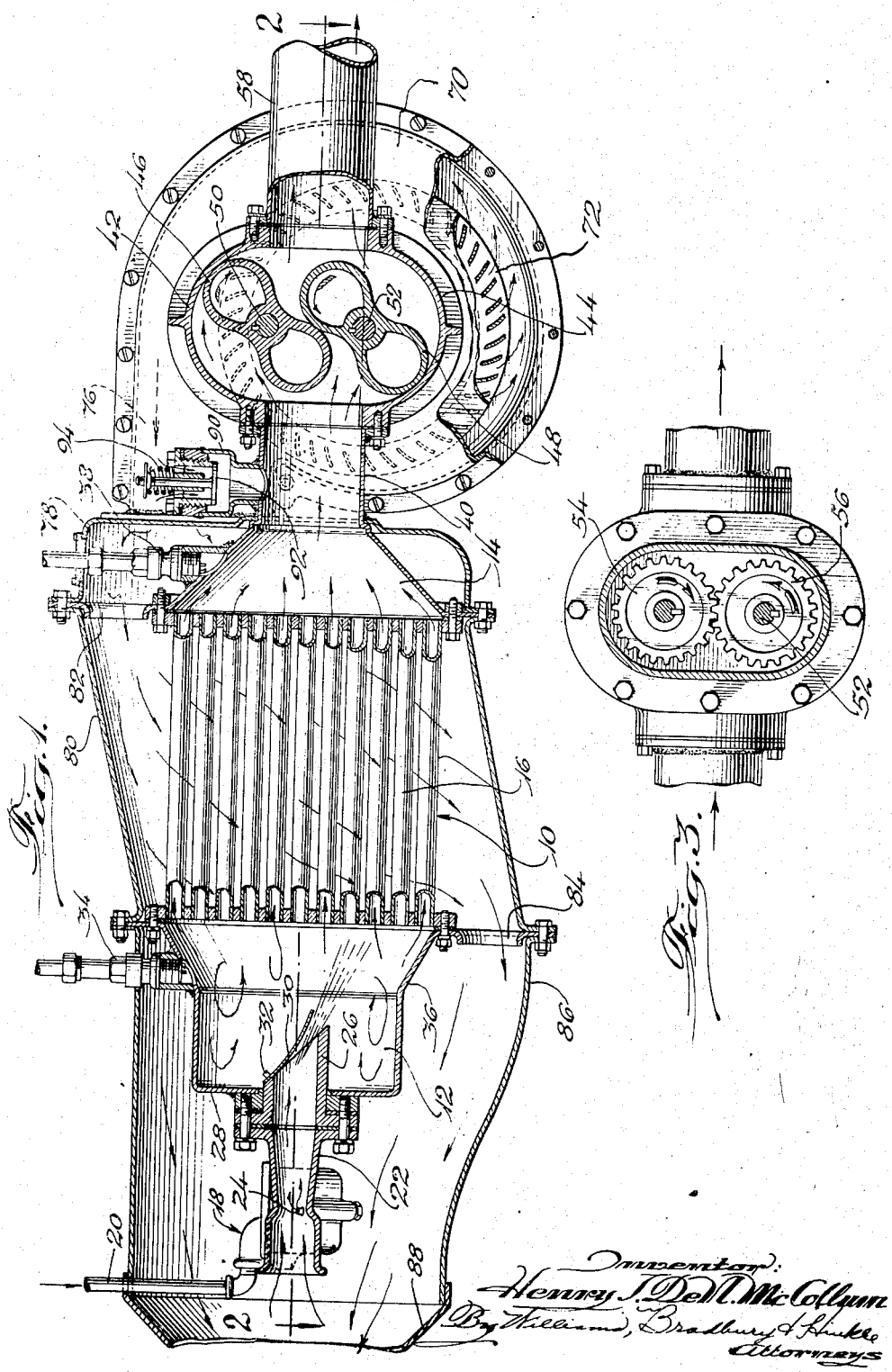
Fig. 1 is a longitudinal sectional view showing a preferred form of my invention.

That embodiment of my invention shown in the drawings comprises a combination combustion chamber and heat exchanger, indicated generally by reference numeral 10 and consisting of an inlet end 12, an outlet end 14, and an intermediate portion formed of a plurality of spaced tubes 16 connecting and in open communication with the inlet and outlet ends. A combustible mixture of fuel and air is supplied to the inlet end 12 of the combustion chamber by a carburetor 18 of any suitable type. A pipe 20 connects the carburetor float bowl with a tank or other suitable source of gasoline or other liquid hydrocarbon fuel.

The carburetor 18 has a Venturi tube 22, and a nozzle 24 delivers fuel to the throat of the Venturi tube where it mixes with air flowing therethrough to form a combustible mixture. The Venturi tube 22 delivers this combustible mixture to an induction tube 26 extending through and secured to the end wall 28 of the inlet end of the combustion chamber. The end face of the induction tube 26 extends at an angle to the axis of the combustion chamber and is provided with a thin valve 30 of the reed type, which is secured to the induction tube by a screw 32 or in any other suitable manner.

The valve 30 is preferably formed of resilient material and is biased away from its seat, as shown, to offer minimum resistance to flow of combustible mixture into the combustion chamber 10. The combustion chamber is shown as being provided with a spark plug 34 secured in the annular wall 36 of the inlet end of the combustion chamber, and a second spark plug 38 secured in the wall of the outlet end of the combustion chamber. When the heater is in operation, one or the other of these spark plugs is connected with a source of current, depending upon whether it is desired to operate the heater at full or partial capacity.

If the heater is operating at only partial capacity, spark plug 34 will be connected with an alternator, hereinafter described, and as soon as the combustible mixture entering the inlet end of the combustion chamber reaches the vicinity of this spark plug, an explosion will result. This explosion will cause hot products of combustion to rush through the tubes 16 and give up part of their heat to the walls of these tubes, which form part of a heat exchange means. The hot products of combustion, and any other gas or air in the right hand portion of the combustion chamber, will be discharged from this chamber in the form of a blast or puff into the outlet pipe 40 leading to a positive displacement type of prime mover indicated generally by reference character 42.

In the particular embodiment shown, this prime mover comprises a housing 44 and a pair of rotors 46 and 48 keyed to shafts 50 and 52, respectively. Each rotor is symmetrical and has a shape like the figure 8. As best shown in Fig. 3, the shafts 50 and 52 are connected together for rotation in opposite directions by gears 54 and 56 located in a lateral extension of the housing 44. The blast or puff from the combustion chamber drives the rotors 46 and 48 and the shafts connected therewith, and then passes into the exhaust pipe 58 and is discharged to atmosphere.

Figure 2:
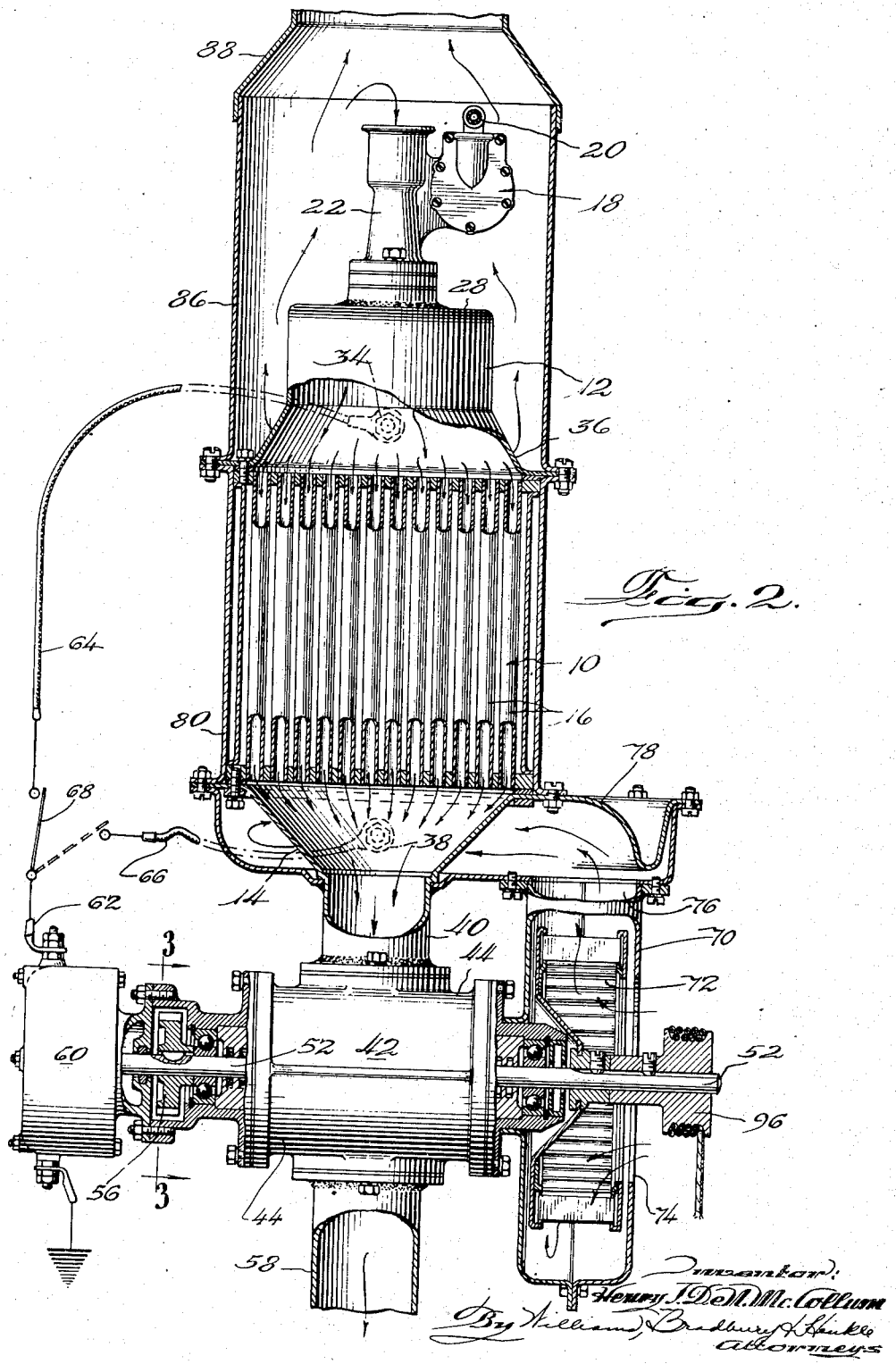
Fig. 2 is a view taken on the line 2—2 of Fig. 1.

Attached to one end of the housing extension is an alternator 60, which supplies current by way of conductors 62, 64 and 66 and switch 68 either to the spark plug 34 or the spark plug 38. In Fig. 2 the two-way switch 68 is positioned to connect the spark plug 34 with the alternator 60. The spark plugs and alternator are grounded as indicated in Fig. 2. The rotating element of the alternator 60 is attached to one end of the shaft 52 and rotates therewith.

A blower casing 70 is attached to the other end of the housing 44 and contains a sirocco type blower 72 mounted on the shaft 52 and rotatable therewith. Rotation of this blower draws air through the casing inlet 74 and discharges this air through the blower outlet 76 into a duct 78 communicating with the right hand end of the heater casing 80, as viewed in Fig. 1. It should be noted that the duct 78 surrounds the outlet end of the combustion chamber, and some heat is absorbed by the air as it flows through this duct.

The air discharged by the blower 72 into the heater casing 80 enters this casing through an inlet opening 82 and flows downwardly between and around the pipes 16 and absorbs heat therefrom. This air then passes through an opening 84 leading into a second section 86 of the heater casing. This second section contains the inlet end of the combustion chamber and the carburetor 18. Some additional heat is absorbed by the air from the walls of the inlet end of the combustion chamber. Most of the heated air is then discharged through the outlet 88 into a space to be heated or into ventilating pipes leading to one or more outlets in the same or different spaces. A small part of the heated air entering the portion 86 of the heater casing flows into the Venturi tube 22 where it mixes with fuel to form the combustible mixture delivered to the combustion chamber.

I have found it desirable to provide special means for preventing overheating of the prime mover 42. In the form of my invention shown in the drawings, this means comprises an air inlet 90 communicating with the pipe 40 and located between the combustion chamber and the prime mover. This air inlet has a valve member 92, which is normally held against its seat by a light spring 94 to close the inlet. This valve is so arranged that an explosion in the combustion chamber tends to press the valve member 92 more firmly on its seat to prevent any of the combustion gases from escaping by way of this inlet.

Following each explosion in the combustion chamber and the discharge of exhaust gases therefrom, continued rotation of the rotors 46 and 48 of the prime mover produces a suction in the pipe 40 and inlet 90. This suction serves to draw a fresh charge of combustible mixture into the combustion chamber through the Venturi tube 22 and also draws air into the pipe 40 through inlet 90. This air passes into the prime mover and cools the rotors 46 and 48 and the inner walls of the housing 44 to prevent overheating by the successive explosions resulting from continued heater operation. This cooling air then is discharged into the exhaust pipe 58.

The extreme right hand end of the shaft 52 as shown in Fig. 2 is provided with a drum 96 to which a pull rope may be attached for starting the heater. Any other suitable electrical, mechanical or manual starting means may be substituted for the drum 96. Where it is desired to make the heater independent of any outside source of energy, a manual or mechanical starting device is preferable and the simple type shown is entirely satisfactory for most purposes.

When it is desired to initiate heater operation, a rope is wound about the drum 96 and given a sharp pull to rotate shaft 52 and the elements mounted thereon. Rotation of this shaft causes the alternator 60 to supply current to the particular spark plug with which it is connected. Rotation of this shaft also causes the blower 72 to force air into the duct 78 and through the heater casing 80 and 86 to create a pressure somewhat above atmospheric at the carburetor inlet. At the same time, the rotors 46 and 48 of the prime mover are rotated to create a suction in the combustion chamber and to draw air through the inlet 90.

The suction created in the combustion chamber and the super-atmospheric pressure created at the carburetor inlet combine to produce a flow of combustible mixture into the left hand or inlet end of the combustion chamber. If the heater switch 68 is set for partial heat output, this mixture ignites as soon as it reaches the spark plug 34. In Fig. 2 of the drawings, however, the switch 68 is set for maximum heat output, and, therefore, this mixture would not ignite until it reaches the spark plug 38. The resulting explosion closes valve 30 and air inlet valve member 92 and transmits heat to the walls of the combustion chamber where it is absorbed by the air driven thereover by the blower 72. The explosion also causes a blast of gas to enter the casing 44 and rotate the rotors 46 and 48, which continue to drive the alternator 60 and blower 72.

After the last of the exhaust gases flow to the prime mover, the continued rotation of the rotors 46 and 48 draws air through the inlet 90 and aids in drawing a fresh charge of combustible mixture into the combustion chamber. The air entering the inlet 90 passes through the prime mover and serves as cooling air to prevent overheating. As soon as the fresh charge of combustible mixture reaches the spark plug 38, a new explosion occurs, and the cycle is repeated. The continuing explosions continue to drive the blower and alternator to maintain the flow of air and electricity, and the heater continues to operate until the switch 68 is moved to an intermediate position where no current is supplied to either spark plug, or until the supply of fuel to the heater is exhausted or cut off by any suitable control.

While I have illustrated and described only one embodiment of my invention, it is to be understood that my invention may assume numerous forms and that my invention includes all modifications, variations and equivalents coming within the scope of the appended claims.

I claim:

1. An internal combustion heater comprising a casing formed with an outlet for heated air, a blower discharging air to be heated into and through said casing toward said outlet, means forming a combustion chamber in the casing, a heat exchanger in the casing connected to said combustion chamber to convey the products of combustion therefrom in out-of-contact heat exchange relation to said air flowing through the casing, means to supply charges of explosive mixture intermittently to said combustion chamber, means including a rotary motor connected to the heat exchanger to receive the exhaust gas therefrom, means for igniting said explosive charges at intervals to provide power for driving said motor by the pressure of the products of combustion, and a driving connection from said motor to the blower.

2. An internal combustion heater comprising a casing formed with an outlet for heated air, a blower discharging air to be heated into and through said casing toward said outlet, means forming a combustion chamber in the casing, a heat exchanger in the casing connected to said combustion chamber to convey the products of combustion therefrom in out-of-contact heat exchange relation to said air flowing through the casing, means to supply charges of explosive mixture intermittently to said combustion chamber, an air induction tube leading into the combustion chamber, a carburetor connected to deliver fuel into said tube to form an explosive mixture, a check valve opening from said tube toward the combustion chamber and controlling the admission of said explosive charges thereto, means for igniting said charges at intervals, means including a rotary motor connected to the heat exchanger and driven by power impulses from the explosion of said charges, said motor and blower having sufficient mass to operate on momentum after each explosion and produce suction to draw a fresh charge past the check valve and into the combustion chamber, and a driving connection from said motor to the blower.

3. An internal combustion heater comprising a casing formed with an outlet for heated air, a blower discharging air to be heated into and through said casing toward said outlet, means forming a combustion chamber in the casing, a heat exchanger in the casing connected to said combustion chamber to convey the products of combustion therefrom in out-of-contact heat exchange relation to said air flowing through the casing, means to supply charges of explosive mixture intermittently to said combustion chamber, an air induction tube leading into the combustion chamber, a carburetor connected to deliver fuel into said tube to form an explosive mixture, a valve controlling the admission of said explosive charges to the combustion chamber, means for igniting said charges at intervals, means including a rotary motor connected to the heat exchanger and driven by power impulses from the explosion of said charges, said motor and blower having sufficient mass to actuate said valve for controlling the admission of fresh charges to the combustion chamber, and a driving connection from said motor to the blower.

HENRY J. DeN. McCOLLUM.